US010497302B2

(12) United States Patent
Peng et al.

(10) Patent No.: US 10,497,302 B2
(45) Date of Patent: Dec. 3, 2019

(54) DISPLAY DRIVING DEVICE AND DISPLAY DEVICE INCLUDING THE SAME

(71) Applicant: SAMSUNG ELECTRONICS CO., LTD., Suwon-si, Gyeonggi-do (KR)

(72) Inventors: Ken Peng, Taipei (TW); Ryan Wang, Taipei (TW); Jae Yoon Kim, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/365,976

(22) Filed: Dec. 1, 2016

(65) Prior Publication Data

US 2017/0278451 A1 Sep. 28, 2017

(30) Foreign Application Priority Data

Mar. 24, 2016 (KR) ........................ 10-2016-0035157

(51) Int. Cl.
*G06F 3/038* (2013.01)
*G09G 3/20* (2006.01)
*G09G 3/36* (2006.01)

(52) U.S. Cl.
CPC ......... *G09G 3/2092* (2013.01); *G09G 3/3677* (2013.01); *G09G 2310/0289* (2013.01); *G09G 2310/08* (2013.01); *G09G 2330/027* (2013.01)

(58) Field of Classification Search
CPC ........... G09G 3/2092; G09G 2330/027; G09G 2310/08
See application file for complete search history.

(56) References Cited

U.S. PATENT DOCUMENTS

| | | | | |
|---|---|---|---|---|
| 6,621,489 B2 | 9/2003 | Yanagisawa et al. | | |
| 7,109,965 B1 | 9/2006 | Lee et al. | | |
| 7,271,801 B2 | 9/2007 | Toyozawa et al. | | |
| 7,602,364 B2 | 10/2009 | Shih et al. | | |
| 8,040,309 B2 | 10/2011 | Hung et al. | | |
| 8,502,812 B2 | 8/2013 | Lee et al. | | |
| 8,625,039 B2 | 1/2014 | Tajiri et al. | | |
| 2006/0238443 A1* | 10/2006 | Derichs | ................ | G09G 3/3473 345/55 |
| 2010/0079443 A1* | 4/2010 | Chang | .................. | G09G 3/3677 345/214 |
| 2016/0189624 A1* | 6/2016 | Jang | ..................... | G09G 3/3258 345/213 |
| 2016/0277008 A1* | 9/2016 | Green | ................... | H02M 3/158 |

* cited by examiner

*Primary Examiner* — Kent W Chang
*Assistant Examiner* — Andrew Lee
(74) *Attorney, Agent, or Firm* — Lee & Morse, P.C.

(57) ABSTRACT

A display driving device includes a power circuit, a gate driver, a data driver, and a controller. The power circuit generates gate supply voltages. The gate driver applies a gate driving signal to gate lines. The data driver applies data signals to data lines intersecting the gate lines. The controller controls the power circuit, the gate driver, and the data driver to set the gate driving signal to be at least one of the gate supply voltages when abnormal power off occurs. The controller also controls the power circuit to allow the gate supply voltages to be discharged naturally.

18 Claims, 10 Drawing Sheets

DISPLAY DRIVING DEVICE AND DISPLAY DEVICE INCLUDING THE SAME

CROSS-REFERENCE TO RELATED APPLICATION

Korean Patent Application No. 10-2016-0035157, filed on Mar. 24, 2016, and entitled, "Display Driving Device and Display Device Including the Same," is incorporated by reference herein in its entirety.

BACKGROUND

1. Field

One or more embodiments described herein relate to a display driving device and a display device including a display driving device.

2. Description of the Related Art

A variety of flat panel displays have been developed. Examples include liquid crystal displays and organic light emitting displays. These devices use one or more driving circuits to drive the pixels in a display panel. When power to the display is abnormally disrupted (e.g., by sudden removal of a battery of a host device), a power outage, flickering, afterimage effects, and other problems may occur, for example, based on residual electric charges in the pixels.

SUMMARY

In accordance with one or more embodiments, a display driving device includes a power circuit to generate a plurality of gate supply voltages; a gate driver to apply a gate driving signal to a plurality of gate lines; a data driver to apply data signals to a plurality of data lines intersecting the gate lines; and a controller to control the power circuit, the gate driver, and the data driver to set the gate driving signal to be at least one of the gate supply voltages when abnormal power off occurs, and to control the power circuit to allow the gate supply voltages to be discharged naturally.

In accordance with one or more other embodiments, a display device includes a panel including a plurality of gate lines, a plurality of data lines intersecting the gate lines, and a plurality of pixels at intersections of corresponding ones of the gate lines and data lines, and a display driving device to apply a gate driving signal to the gate lines, apply data signals to the data lines, and set the gate driving signal to be at least one of a plurality of gate supply voltages in order to allow the gate supply voltages to be discharged naturally when abnormal power off occurs.

In accordance with one or more other embodiments, an apparatus includes a connection to a display panel and a driver coupled to receive residual electric charge from one or more pixels in the display panel through the connection, wherein the driver is to receive the residual electric charge from the one or more pixels based on a disruption in power to the display panel.

BRIEF DESCRIPTION OF THE DRAWINGS

Features will become apparent to those of skill in the art by describing in detail exemplary embodiments with reference to the attached drawings in which.

DETAILED DESCRIPTION

Figure 1A:
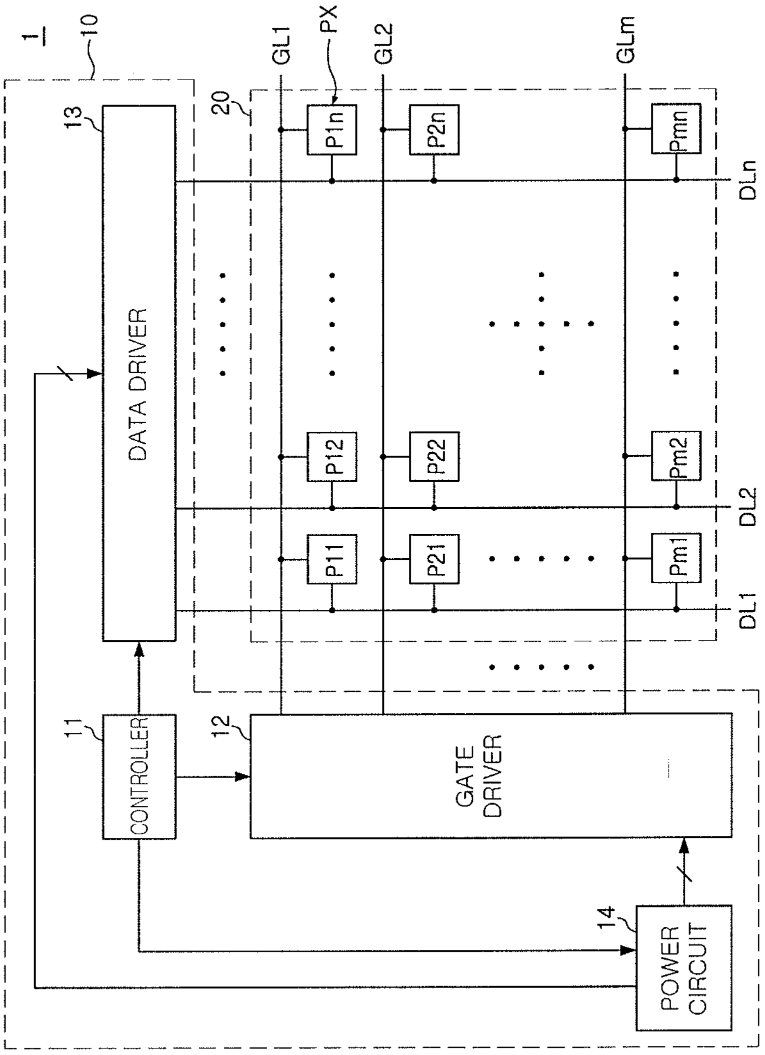
FIG. 1A illustrates an embodiment of a display device and FIG. 1B illustrates an embodiment of a pixel.

FIG. 1A illustrates an embodiment of a display device 1 which may include a controller 11, a gate driver 12, a data driver 13, a power circuit 14, and a panel 20. The controller 11, the gate driver 12, the data driver 13, and the power circuit 14 may be, for example, in the display driving device 10. The panel 20 may include at least one transparent substrate. A plurality of gate lines GL1-GLm and a plurality of data lines DL1-DLn may intersect on the transparent substrate. A plurality of pixels PX may be at intersections of corresponding ones of the gate lines GL1-GLm and data lines DL1-DLn.

Figure 1B:
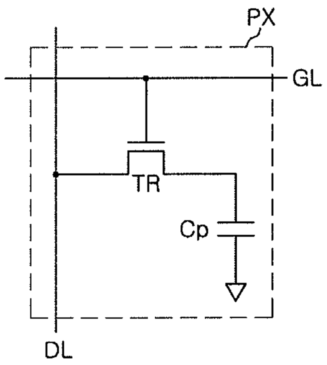

FIG. 1B illustrates an embodiment representative of the pixels. Referring to FIG. 1B, each pixel PX may include a transistor having a gate electrode and a source electrode, connected to one of the gate lines GL1-GLm and one of the data lines DL1-DLn, and may include a capacitor connected to a drain electrode of the transistor. The capacitor may be, for example, a storage capacitor. When the display device 1 is a liquid crystal device (LCD), the capacitor may be connected to a liquid crystal capacitor.

The controller 11 may generate image data to display an image on the panel 20 based on image data from an external source, a control signal, or the like. The controller 11 may include an image generating circuit, a timing controller, a memory circuit, and the like. The timing controller may generate a signal to control driving timing of signals that the gate driver 12 and the data driver 13 send to the gate lines GL1-GLm and the data lines DL1-DLn, respectively.

The gate driver 12 may scan the gate lines GL1-GLm based on a control signal from the controller 11. In an example embodiment, the gate driver 12 may apply gate supply voltages to select the gate lines GL1-GLm. A gate line GL1-GLm selected by the gate supply voltage may thus be activated. The data driver 13 may apply a grayscale voltage to each of the pixels PX, connected to an activated one of the gate line GL1-GLm, in order to display an image.

The data driver 13 may apply the grayscale voltage to the data lines DL1-DLn based on the control signal from controller 11. The grayscale voltage may be, for example, an analog signal for displaying the image. The grayscale voltage may be applied to a data line DL1-DLn connected to the gate line GL1-GLm activated by the gate supply voltage from the gate driver 12. Therefore, an image may be displayed in the order in which the gate driver 12 scans the gate line GL1-GLm, e.g., based on a horizontal line unit of the panel 20.

The power circuit 14 may generate various internal voltages for operation of the display device 1, for example, based on an external voltage from an external source. In one embodiment, one or more internal voltages may be provided at different levels. The power circuit 14 may include a charge pump circuit, and the like, to generate the internal voltage. In an example embodiment, the power circuit 14 may generate the gate supply voltage for scanning the gate line GL1-GLm based on the external voltage. The gate supply voltage may have a level different from that of the external voltage.

Referring again to FIG. 1B, each pixel PX may include a switch device TR connected to a gate line GL and a data line DL. The switch device TR may be connected to the gate line GL by a gate electrode and may be connected to the data line DL by a source electrode. The switch device TR may be a transistor and a drain electrode of the switch device TR may be connected to a pixel capacitor Cp. The pixel capacitor Cp may be a storage capacitor. In the case of an LCD, the pixel capacitor Cp may further include the liquid crystal capacitor. In the case of an organic light emitting device (OLED), the pixel capacitor Cp may be used to control current to an organic electroluminescence element of each pixel. The pixel PX may have a shape different from the example illustrated in FIG. 1B.

The grayscale voltage applied to each pixel PX may accumulate electric charge in the storage capacitor. Therefore, when power to the display device 1 is turned off, the display driving device may allow for removal of the electric charge accumulated in the storage capacitor. When the electric charge accumulated in the storage capacitor is not removed effectively, flickering, an afterimage effect, or another anomaly may occur in the display device 1.

For example, when a residual electric charge in the pixel PX is not removed effectively when power is abnormally turned off (e.g., when a battery is removed from a mobile device, when a blackout, etc.), flickering, an afterimage effect, or the like, may occur when power is reapplied to the panel 20. In an example embodiment, the display driving device effectively removes residual electric charge of each pixel PX. Therefore, flickering, an afterimage effect, or another anomaly will not occur from residual pixel charge when power is abnormally turned off.

Figure 2A:
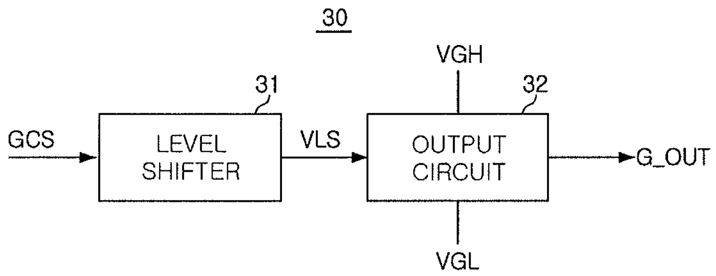
FIGS. 2A and 2B illustrate embodiments of a gate driver.
Figure 2B:
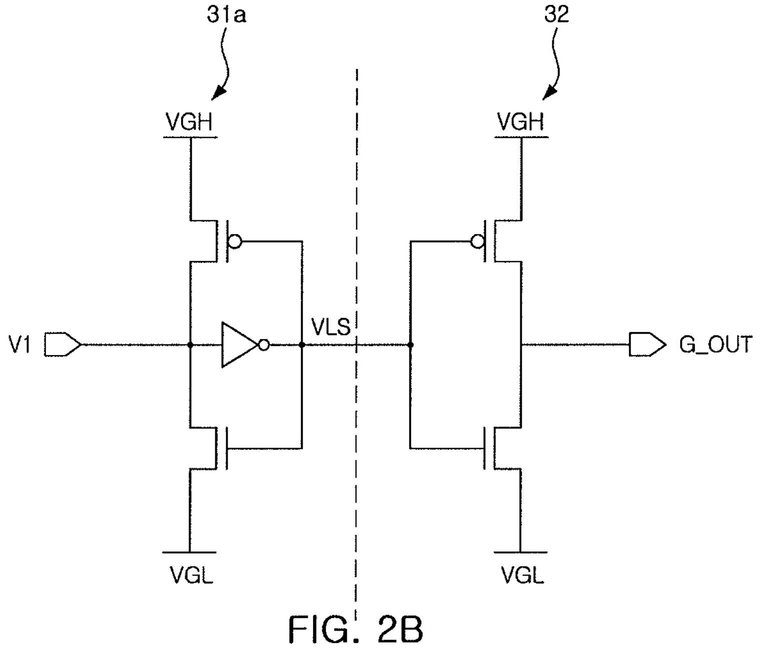

FIGS. 2A and 2B illustrate embodiments of a gate driver 30 which may include a level shifter 31 and a gate driving circuit 32. The level shifter 31 may generate an output voltage VLS for driving the gate driving circuit 32 based on a gate control signal GCS from an external source. The gate driving circuit 32 may transmit a gate driving signal G_OUT to at least one of the gate lines GL1-GLm based on the output voltage VLS from the level shifter 31.

The gate driving signal G_OUT applied to the gate line GL1-GLm may be, for example, one of the gate supply voltages VGH and VGL generated by the power circuit 14. The output voltage VLS supplied to the gate driving circuit 32 may also be one of the gate supply voltages. The gate supply voltages VGH and VGL may include a first gate supply voltage VGH and a second gate supply voltage VGL having a magnitude lower than the first gate supply voltage VGH.

In an example embodiment, the level shifter 31 in the gate driver 30 may include a latch-type level shifter performing the function of a latch. Therefore, even when an external voltage is not supplied when power is abnormally turned off, an output of the level shifter 31 may be maintained for a specific period of time. While the output of the level shifter 31 is maintained, residual electric charge of a pixel PX may be removed through the gate line GL1-GLm connected to the gate driving circuit 32.

Referring to FIG. 2B, a more detailed embodiment of the gate driver 30 employs a latch circuit 31*a* and an output terminal for level shifter 31 and an inverter circuit for gate driving circuit 32. The latch circuit 31*a* includes two inverters, and the output voltage VLS of the latch circuit 31*a* is one of the gate supply voltages VGH and VGL.

In an example embodiment illustrated in FIG. 2B, both inverter circuits in the latch circuit 31*a* and the gate driving circuit 32 may be operated based on the gate supply voltages VGH and VGL. The gate supply voltages VGH and VGL may include the first gate supply voltage VGH having a high voltage level and the second gate supply voltage VGL having a low voltage level. The gate supply voltages VGH and VGL may be generated by the power circuit 14.

The latch circuit 31*a* may allow the output voltage VLS of the level shifter 31 to be maintained when power is turned off abnormally. In an example embodiment, when power is turned off abnormally, the power circuit 14 may naturally discharge an internal gate driving voltage, for example, the gate supply voltage VGH and the gate supply voltage VGL. Therefore, the latch circuit 31*a* may allow the output voltage VLS of the level shifter 31 to be maintained as one of the gate supply voltages VGH or VGL while the gate supply voltages VGH and VGL are discharged naturally. Because they are naturally discharged, the gate supply voltages VGH and VGL may not be connected to a ground terminal GND and may float to be discharged.

In an example embodiment, when an input voltage V1 of the latch circuit 31*a* is provided as the first gate supply voltage VGH, the output voltage VLS of the level shifter 31 may be provided as the second gate supply voltage VGL. In this case, the gate driving circuit 32 may output the first gate supply voltage VGH as the gate driving signal G_OUT. When the input voltage V1 of the latch circuit 31*a* is provided as the second gate supply voltage VGL, the gate driving circuit 32 may output the second gate supply voltage VGL as the gate driving signal G_OUT.

In other words, while the gate supply voltages VGH and VGL are naturally discharged as power is abnormally cut, the gate driving signal G_OUT may be maintained at one level of the gate supply voltages VGH or VGL through the latch circuit 31*a* and the gate driving circuit 32. Therefore, while the gate driving signal G_OUT is maintained at one level of the gate supply voltages VGH or VGL that are naturally discharged after power is turned off abnormally, residual electric charge in the pixel PX may be removed effectively while the gate supply voltages VGH and VGL are discharged naturally.

Figure 3:
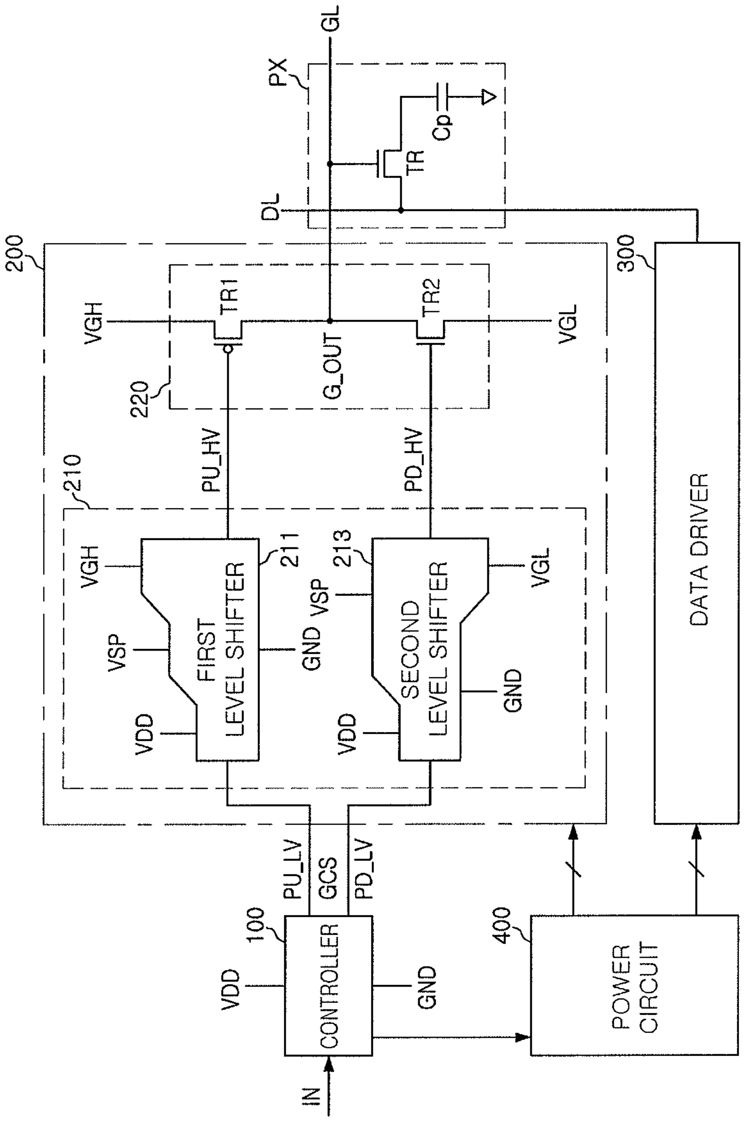
FIG. 3 illustrates an embodiment of a display driving.

FIG. 3 illustrates another embodiment of a display driving device which may include a controller 100, a gate driver 200, and a data driver 300. The gate driver 200 may apply a gate driving signal G_OUT to at least one of a plurality of gate lines GL. The data driver 300 may apply an image signal to a data line DL, intersecting the gate line GL, activated by the gate driving signal G_OUT. The display driving device may include a power circuit 400 to supply power voltage for driving the controller 100, the gate driver 200, and the data driver 300.

The controller 100 may include a control logic, a timing controller, and the like, and may generate a gate control signal GCS to control operation of the gate driver 200 based on a control signal IN from an external source. The controller 100 may be operated by a supply voltage VDD and a ground voltage GND. The gate control signal GCS may be sent to a level shifter 210 in the gate driver 200.

The level shifter 210 may include a first level shifter 211 and a second level shifter 213. The first level shifter 211 may be controlled by a pull-up gate control signal PU_LV. The second level shifter 213 may be controlled by a pull-down gate control signal PD_LV. Each of the first level shifter 211 and the second level shifter 213 may be operated by the supply voltage VDD, the ground voltage GND, the gate supply voltages VGH and VGL, a source voltage VSP, and/or other signals.

The first level shifter 211 and the second level shifter 213 may respectively apply the pull-up output signal PU_HV and the pull-down output signal PD_HV to a gate driving circuit 220. The gate driving circuit 220 may include an inverter circuit operated by gate supply voltages VGH and VGL. In addition, the pull-up output signal PU_HV and the pull-down output signal PD_HV may be respectively applied to gate terminals of switch devices TR1 and TR2. In an example embodiment, the pull-up output signal PU_HV and the pull-down output signal PD_HV may have the same voltage levels as those of a first gate supply voltage VGH and a second gate supply voltage VGL, respectively. In another embodiment, these voltage levels may be different.

The input signal IN, received by the controller 100 from an external source, may have a high voltage level or a low voltage level. When the input signal IN has a high voltage level, the first level shifter 211 may output the ground voltage GND as the pull-up output signal PU_HV, while the second level shifter 213 may output the second gate supply voltage VGL as the pull-down output signal PD_HV. Therefore, the first switch device TR1 of the gate driving circuit 220 may be turned on and the first gate supply voltage VGH may be output as the gate driving signal G_OUT. When the input signal IN has a low voltage level, the first level shifter 211 may output the first gate supply voltage VGH as the pull-up output signal PU_HV, while the second level shifter 213 may output the source voltage VSP as the pull-down output signal PD_HV. Therefore, the second switch device TR2 may be turned on, and therefore the second gate supply voltage VGL may be output as the gate driving signal G_OUT.

Thus, when power is supplied normally, the gate driving signal G_OUT is determined to be the first gate supply voltage VGH (e.g., a voltage having a high level) when the input signal IN has a high voltage level. The gate driving signal G_OUT may be determined to be the second gate supply voltage VGL (e.g., a low voltage level) when the input signal IN has a low voltage level.

When power is cut abnormally (e.g., sudden battery removal of a host device or blackout) during normal operation as described above, the display driving device may perform an operation to remove a residual electric charge of a pixel PX.

Figure 4:
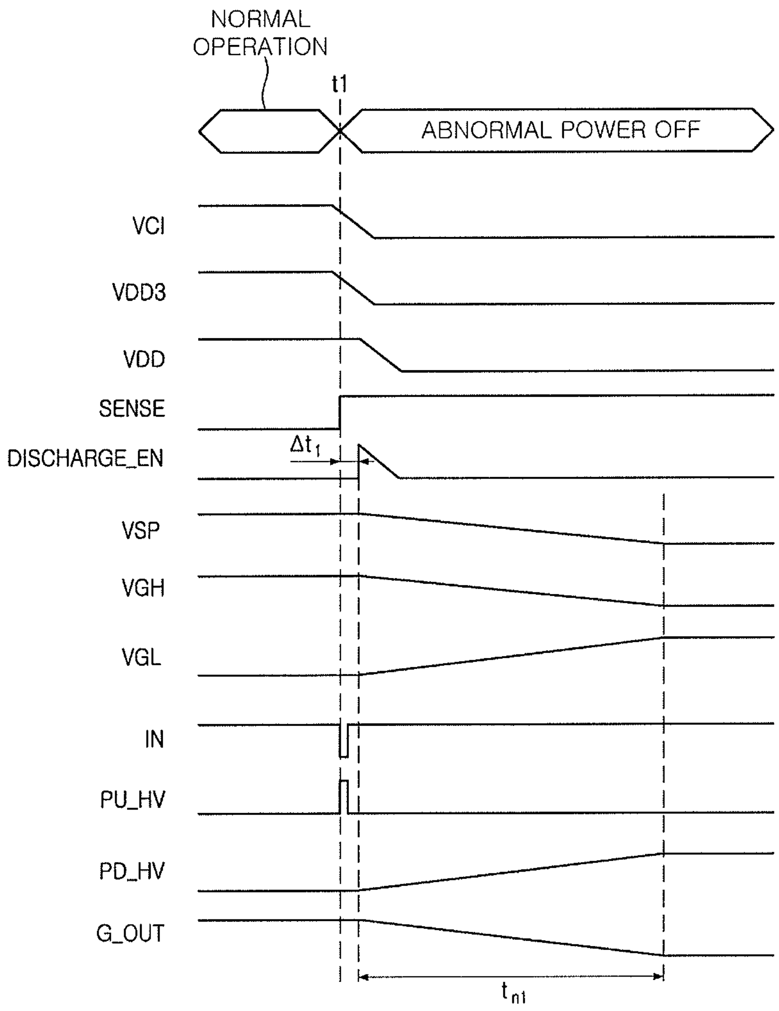
FIGS. 4 and 5 illustrate embodiments for operating a display driving device.
Figure 5:
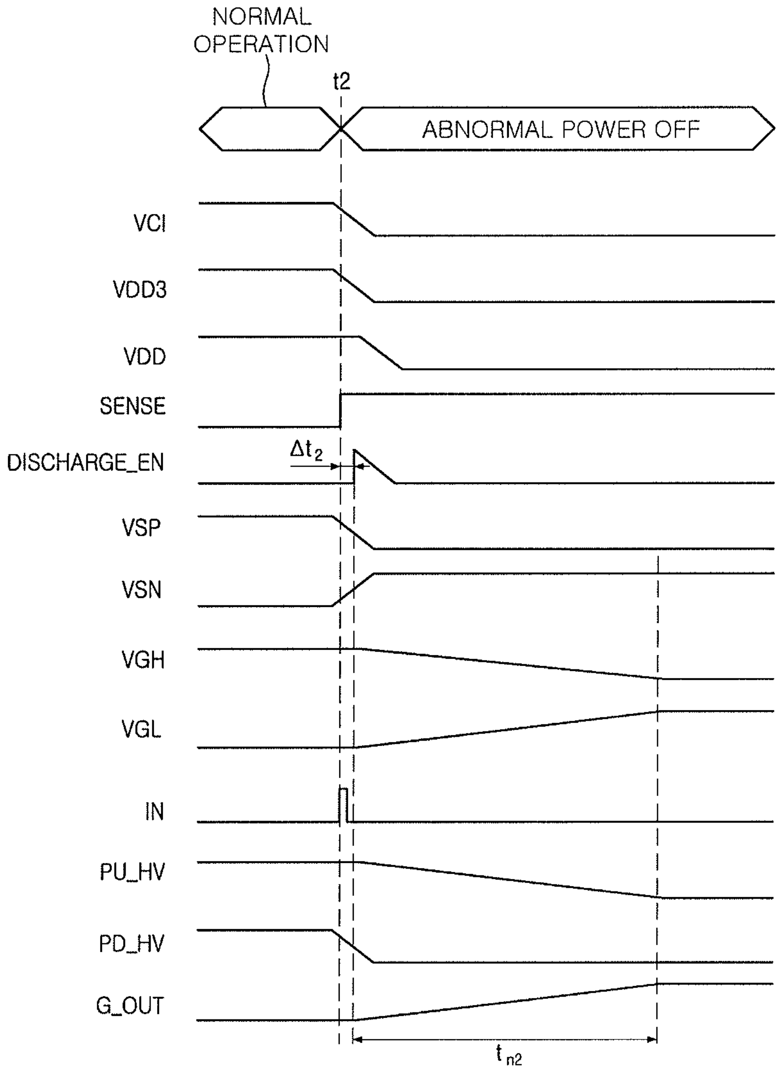
Figure 6:
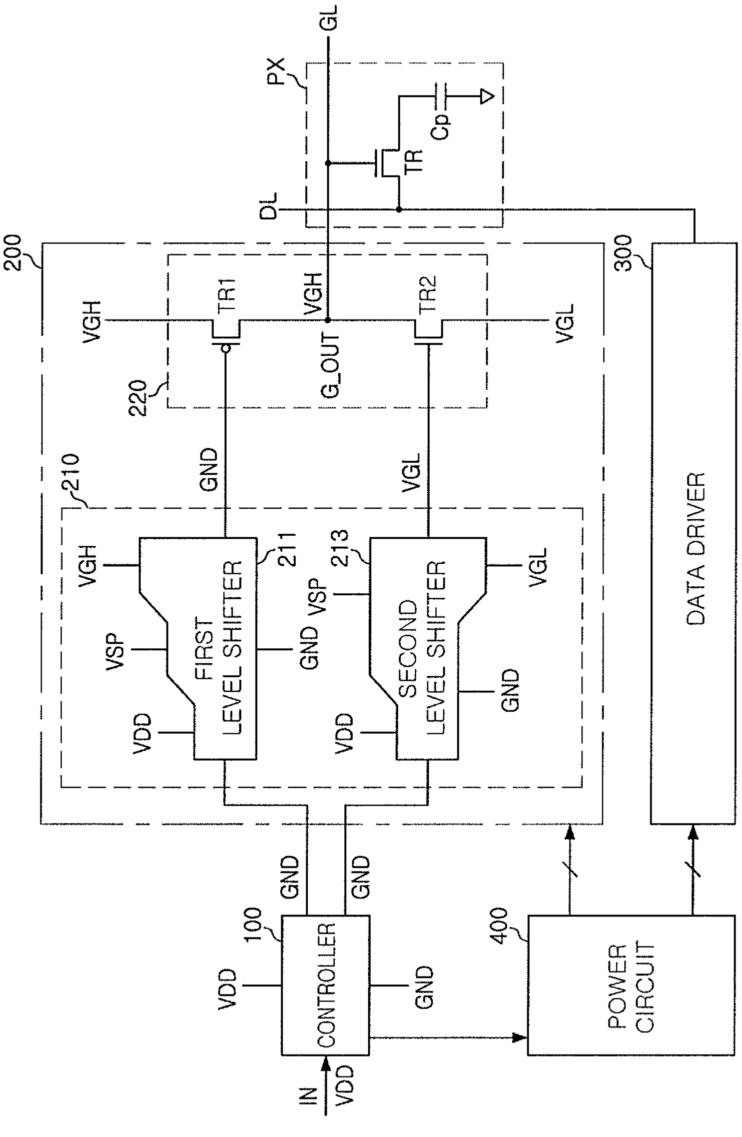
FIGS. 6 and 7 illustrate more embodiments for operating a display driving device.
Figure 7:
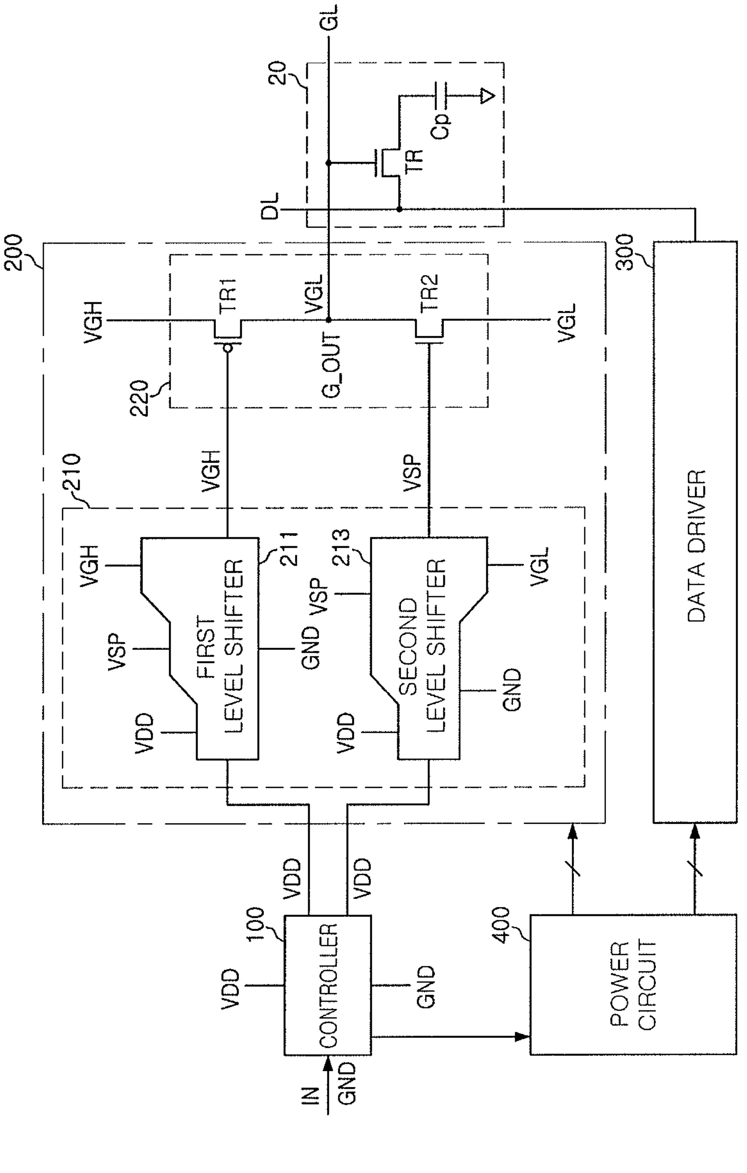

FIGS. 4 and 5 are timing diagrams illustrating embodiments for operating a display driving device. FIGS. 6 and 7 illustrating corresponding operations of the display driving device according to the timing diagrams in FIGS. 4 and 5.

Referring to FIGS. 4 and 6, the display driving device may receive two external voltages VCI and VDD3. When battery removal, a blackout, or the like, occurs, the display driving device may detect that magnitudes of external voltages VCI and VDD3 drop to a predetermined critical voltage level or lower, thereby determining that power has been turned off abnormally. In the example embodiment in FIG. 4, an abnormal power off detection signal SENSE transitions at a time t1, so that abnormal power off may be detected.

When abnormal power off is detected, the display driving device may allow a predetermined delay time $\Delta t_1$ to be set. Until the delay time $\Delta t_1$ passes, a discharge signal DISCHARGE_EN of an internal voltage may not be activated. In the meantime, during the delay time $\Delta t_1$, an input signal IN may be set to have a specific level to remove residual electric charge of a pixel PX. In the example embodiment in FIG. 4, the input signal IN may be set to have a high voltage level, e.g., the same level as a supply voltage VDD.

Referring to FIG. 6, when the input signal IN is set to the high voltage level, a pull-up output signal PU_HV and a pull-down output signal PD_HV, output by a first level shifter 211 and a second level shifter 213, may be set to a ground voltage GND and a second gate supply voltage VGL, respectively. A gate driving circuit 220 may output a first gate supply voltage VGH to be a gate driving signal G_OUT, depending on the set pull-up output signal PU_HV and the set pull-down output signal PD_HV.

After the delay time $\Delta t_1$ has elapsed, the display driving device may allow the internal voltages to be forcibly discharged. In this case, the gate supply voltages VGH and VGL for outputting the gate driving signal G_OUT may be discharged naturally. Therefore, as illustrated in FIG. 4, the gate supply voltages VGH and VGL may have a relatively long time $t_{n1}$, compared with other internal voltages such as VDDs.

Referring again to FIGS. 4 and 6, during time $t_{n1}$ when the gate supply voltages VGH and VGL are discharged naturally, the gate driving signal G_OUT may have the same level as the first gate supply voltage VGH. Therefore, the gate driving signal G_OUT may also be naturally discharged along with the gate supply voltages VGH and VGL. Thus, because the gate driving signal G_OUT is applied to a gate line GL during time $t_{n1}$ when the gate supply voltages VGH and VGL are discharged naturally, residual electric charge of pixel PX may be removed through the display driving device during time $t_{n1}$.

In the meantime, the gate driving signals G_OUT applied to the gate line GL may be set differently, for example, according to the intended application. For example, during time $t_{n1}$ when the gate supply voltages VGH and VGL are discharged naturally, the first gate supply voltage VGH may be applied to a portion of the gate line GL as the gate driving signal G_OUT, and the second gate supply voltage VGL may be applied to a different gate line GL as the gate driving signal G_OUT.

Referring to FIGS. 5 and 7, the display driving device may be operated by four external voltages VCI, VDD3, VSP, and VSN. With reference to the timing diagram of FIG. 5, at least one of the external voltages VCI, VDD3, VSP, or VSN may be detected to drop to a level less than a critical voltage level at time t2, and an abnormal power off detection signal SENSE may transition.

When abnormal power off is detected, the display driving device allows a predetermined delay time $\Delta t_2$ to be set, and a discharge signal DISCHARGE_EN of an internal voltage may not be activated, until delay time $\Delta t_2$ passes. During the delay time $\Delta t_2$, an input signal IN may be set to have a specific level in order to remove residual electric charge of a pixel PX. In the example embodiment in FIG. 5, the input signal IN may be set to have a low voltage level, e.g., a ground voltage GND level.

Referring to FIG. 7, as the input signal IN is set to have a low voltage level, a pull-up output signal PD_HV and a pull-down output signal PD_HV, output by a first level shifter 211 and a second level shifter 213, may be set to a first gate supply voltage VGL and a source voltage VSP, respectively. A gate driving circuit 220 may output a second gate supply voltage VGL to be a gate driving signal G_OUT, depending on the set pull-up output signal PU_HV and the set pull-down output signal PD_HV.

After the delay time $\Delta t_2$ has elapsed, the display driving device may allow other internal voltages, except for the gate supply voltages VGH and VGL, to be forcibly discharged. For example, the gate supply voltages VGH and VGL may not be discharged forcibly, but rather may be discharged naturally. Therefore, as illustrated in FIG. 5, the gate supply voltages VGH and VGL may be naturally discharged over a relatively long period of time $t_{n2}$.

Referring to FIGS. 5 and 7, the gate driving signal G_OUT may be maintained as the second gate supply voltage VGL during time $t_{n2}$ when the gate supply voltages VGH and VGL are discharged naturally. Therefore, the gate driving signal G_OUT may also be naturally discharged along with the gate supply voltages VGH and VGL. Thus, since the gate driving signal G_OUT is applied to a gate line GL during time $t_{n2}$ when the gate supply voltages VGH and VGL are discharged naturally, residual electric charge of the pixel PX may be removed through the display driving device during time $t_{n2}$. In an example embodiment, delay times $\Delta t_1$ and $\Delta t_2$ may be set to a predetermined values, e.g., within around 50 us. The delay times may be the same or different.

According to an example embodiment, the display driving device may receive an input signal IN that is reset during the predetermined delay times $\Delta t_1$ and $\Delta t_2$ when power is turned off abnormally. The gate driving signal G_OUT may be set to a specific state by the input signal IN and may be set to have one level of the first gate supply voltage VGH or the second gate supply voltage VGL.

After delay times $\Delta t_1$ and $\Delta t_2$ have elapsed, a power circuit of the display driving device may allow the gate supply voltages VGH and VGL to float to be discharged naturally. Therefore, during the times $t_{n1}$ and $t_{n2}$ when the gate supply voltages VGH and VGL are discharged naturally, the gate driving signal G_OUT is maintained to have the same level as the first gate supply voltage VGH or the second gate supply voltage VGL. Thus, the residual electric charge present in the pixel PX may be removed effectively.

Figure 8:
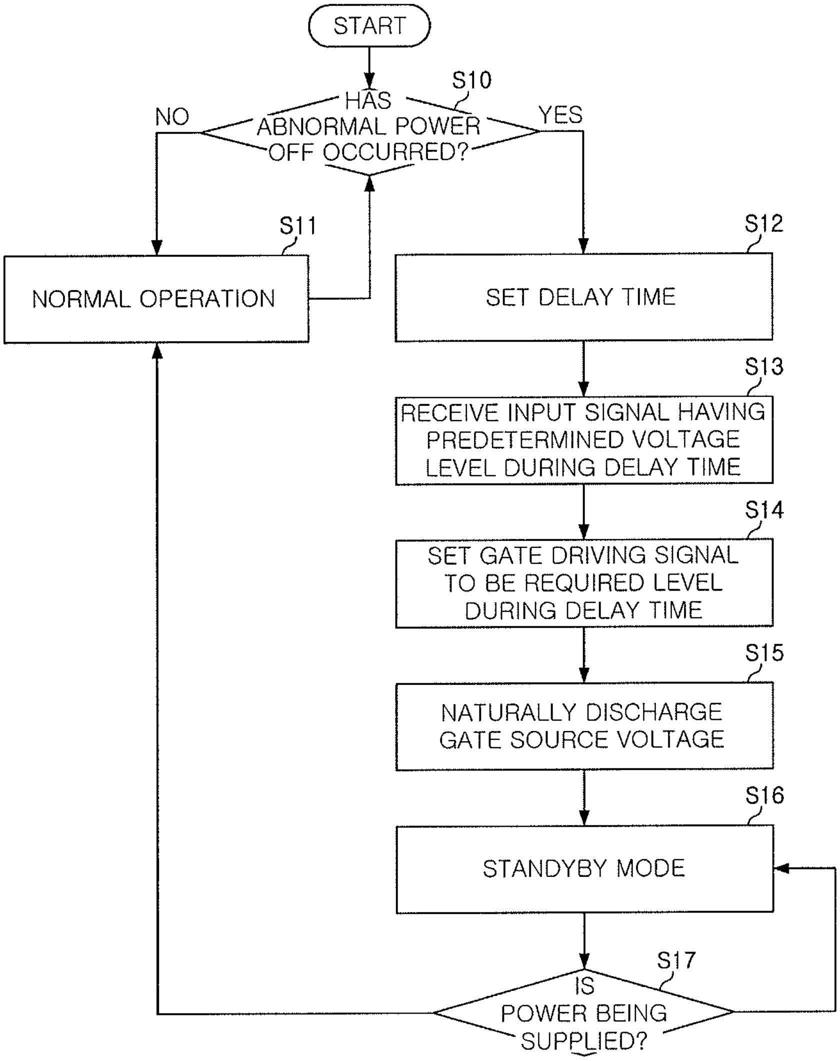
FIG. 8 illustrates an embodiment of a method for operating a display driving device.

FIG. 8 illustrates an embodiment of a method for operating a display driving device. Referring to FIG. 8, the method includes determining whether or not power is abnormally turned off (S10). The display driving device may determine that power is turned off abnormally when at least one of a plurality of external voltages is detected to drop to a predetermined critical voltage level or lower. When power is not turned off abnormally, the display driving device may maintain normal operation (S11).

In the meantime, when it is determined that power is abnormally turned off in S10, the display driving device may allow predetermined delay times $\Delta t_1$ and $\Delta t_2$ to be set, and may receive an input signal IN reset during the delay times $\Delta t_1$ and $\Delta t_2$. The input signal IN may have one of a supply voltage VDD or a ground voltage GND. Thus, the supply voltage VDD may be maintained without being discharged during delay times $\Delta t_1$ and $\Delta t_2$.

The display driving device may allow a gate driving signal G_OUT to be set depending on the input signal IN (S13). In operation S13, the gate driving signal G_OUT may be set to have a proper or predetermined value for removing residual electric charge of a pixel PX through a gate line GL. The gate driving signal G_OUT may be set to the same level as a first gate supply voltage VGH or a second gate supply voltage VGL.

When the gate driving signal G_OUT is set and delay times $\Delta t_1$ and $\Delta t_2$ have elapsed, the display driving device may allow the gate supply voltages VGH and VGL to be naturally discharged (S15). The gate supply voltages VGH and VGL are discharged during relatively long times $t_{n1}$ and $t_{n2}$ compared with other internal voltages. In addition, during times $t_{n1}$ and $t_{n2}$, the gate driving signal G_OUT may be maintained as the gate supply voltages VGH and VGL. Therefore, while the gate driving signal G_OUT is naturally discharged along with the gate supply voltages VGH and VGL, residual electric charge in the pixel PX may be removed through the display driving device.

When natural discharges of the gate supply voltages VGH and VGL are completed, the display driving device may switch to standby mode (S16) and may determine whether or not power is resupplied (S17). When power is resupplied, the display driving device may perform a normal operation as in S11 and may determine whether or not power is abnormally turned off as in S10.

Figure 9:
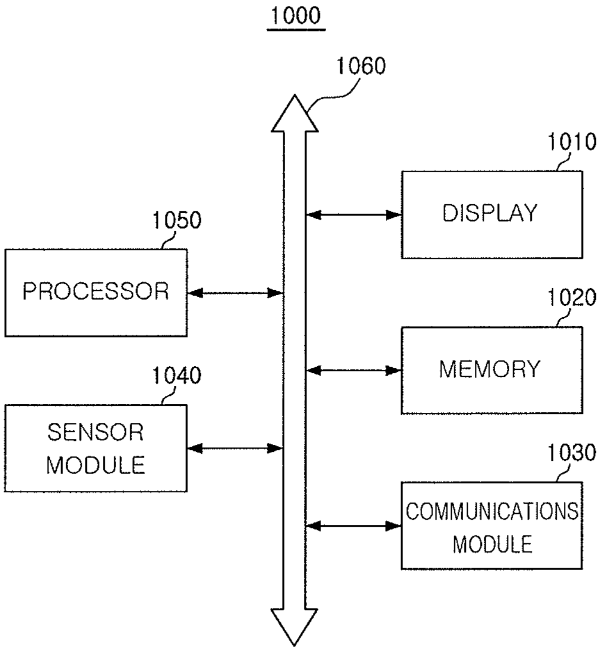
FIG. 9 illustrates an embodiment of an electronic device.

FIG. 9 illustrates an embodiment of an electronic device 1000 which may include a display 1010, a memory 1020, a communications module 1030, a sensor module 1040, a processor 1050, and the like. The electronic device 1000 may include a television, a desktop computer, or the like, or a mobile device such as a smartphone, a tablet PC, a laptop computer, or the like. Components such as the display 1010, the memory 1020, the communications module 1030, the sensor module 1040, the processor 1050, and the like, may communicate with each other through a bus 1060.

The display 1010 may include a display driving device in accordance with any of the aforementioned embodiments. For example, when power is cut abnormally (e.g., battery removal from a host device, a power outage, etc.), the display 1010 may allow a gate driving signal to be set to have one level of gate supply voltages during a predetermined delay time. The display 1010 may allow residual electric charge present in a pixel to be removed effectively through the display driving device, in such a manner that the gate supply voltage is naturally discharged after the delay time has passed.

In accordance with another embodiment, an apparatus includes a connection to a display panel and a driver coupled to receive residual electric charge from one or more pixels in the display panel through the connection. The driver receives the residual electric charge from the one or more pixels based on a disruption in power to the display panel. The connection may be, for example, any of the signal lines corresponding to previous embodiments described herein. When the apparatus or driver is embodied within an integrated circuit chip, the output may be one or more output terminals, leads, wires, ports, signal lines, or other type of interface without or coupled to the driver. The driver may be any of the display driving devices discussed in relation to these embodiments.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The processors, controllers, drivers, shifters, output circuits, and other processing circuits of the embodiments disclosed herein may be implemented in logic which, for example, may include hardware, software, or both. When implemented at least partially in hardware, the processors, controllers, drivers, shifters, output circuits, and other processing circuits may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the processors, controllers, drivers, shifters, output circuits, and other processing circuits may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

According to one or more of the aforementioned embodiments, when power is cut abnormally, a display driving device and a display device may allow a gate driving signal to be set to have a required level during a predetermined delay time. In addition, residual electric charge in a plurality of pixels may be removed while a gate supply voltage is naturally discharged after the delay time has passed. Therefore, a problem, such as flickering, an afterimage, or the like, caused by the residual electric charge when power is abnormally cut (e.g., in the case of battery removal) may be resolved.

Example embodiments have been disclosed herein, and although specific terms are employed, they are used and are to be interpreted in a generic and descriptive sense only and not for purpose of limitation. The embodiments (or portions thereof) may be combined to form additional embodiments. In some instances, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display driving device, comprising:

a power circuit to generate a plurality of gate supply voltages;

a gate driver to apply a gate driving signal to a plurality of gate lines connected to a plurality of pixels, each pixel including a switch transistor and a pixel capacitor;

a data driver to apply data signals to a plurality of data lines intersecting the gate lines; and a controller to control the power circuit, the gate driver, and the data driver, wherein the controller controls the gate driver to output one of the gate supply voltages to each of the plurality of gate lines, as the gate driving signal, when an abnormal power off occurs, and controls the power circuit to float nodes outputting the plurality of gate supply voltages to decrease the gate driving signal, by discharging the plurality of gate supply voltages naturally and to allow a residual electric charge of the pixel capacitor of each pixel being connected to the gate lines through the switch transistor to be removed, while the plurality of gate supply voltages are discharged naturally.

2. The display driving device as claimed in claim 1, wherein the controller is to set a predetermined delay time when the abnormal power off occurs and to set the gate driving signal supplied to the gate lines to be at least one of the gate supply voltages during the predetermined delay time.

3. The display driving device as claimed in claim 2, wherein the power circuit is to allow the gate supply voltages to be discharged naturally after the predetermined delay time has passed.

4. The display driving device as claimed in claim 1, wherein the gate driver includes a gate driving circuit to output the gate driving signal to the gate lines and a level shifter to determine the gate driving signal based on a gate control signal.

5. The display driving device as claimed in claim 4, wherein the level shifter includes a latch circuit connected to an input terminal of the gate driving circuit.

6. The display driving device as claimed in claim 4, wherein the level shifter includes a first level shifter and a second level shifter to output different voltages to the gate driving circuit.

7. The gate driver as claimed in claim 6, wherein the gate driving circuit includes a first switch and a second switch and wherein the first level shifter and the second level shifter are to control the first switch and the second switch, respectively.

8. The display driving device as claimed in claim 7, wherein the gate driving circuit is to output a first gate supply voltage as the gate driving signal when the first switch is turned on by the first level shifter, and is to output a second gate supply voltage as the gate driving signal when the second switch is turned on by the second level shifter.

9. The display driving device as claimed in claim 1, wherein the controller is to determine that the abnormal power off occurs when an external source voltage supplied to the power circuit drops to a predetermined critical voltage level or lower.

10. A display device, comprising:

a panel including a plurality of gate lines, a plurality of data lines intersecting the gate lines, and a plurality of pixels at intersections of corresponding ones of the gate lines and data lines, the plurality of gate lines being connected to the plurality of pixels, each pixel including a switch transistor and a pixel capacitor, and a display driving device to apply a gate driving signal to the plurality of gate lines, apply data signals to the data lines, wherein the display driving device outputs one of a plurality of gate supply voltages to each of the plurality of gate lines, as the gate driving signal, when an abnormal power off occurs, and controls a power circuit to float nodes outputting the plurality of gate supply voltages to decrease the gate driving signal, by discharging the plurality of gate supply voltages naturally and to allow a residual electric charge of the pixel capacitor of each pixel connected to the gate lines through the switch transistor to be removed while the plurality of gate supply voltages are discharged naturally.

11. The display device as claimed in claim 10, wherein the display driving device includes a level shifter to maintain the gate driving signal while the gate supply voltages are discharged naturally.

12. The display device as claimed in claim 11, wherein the display driving device is to apply a first gate supply voltage to a portion of the gate lines as the gate driving signal and is to apply a second gate supply voltage to other ones of the gate lines as the gate driving signal when the abnormal power off occurs.

13. The display device as claimed in claim 10, wherein the gate supply voltages include a first gate supply voltage and a second gate supply voltage lower than the first gate supply voltage.

14. An apparatus, comprising:

a connection to a display panel including a plurality of pixels, each of the plurality of pixels includes a switch transistor and a pixel capacitor; and a driver coupled to input a driver signal to a gate electrode of the switch transistor of one or more pixels in the display panel and receive a residual electric charge of the pixel capacitor of the one or more pixels through the connection, wherein the driver is to receive the residual electric charge of the pixel capacitor of the one or more pixels based on a disruption in power to the display panel, and decreases the driver signal input to the one or more pixels through connection by discharging the driver signal naturally and disconnecting the driver signal from a ground terminal, in response to the disruption in power to the display panel, and the residual electric charge of the pixel capacitor of the one or more pixels is removed.

15. The apparatus as claimed in claim 14, wherein the driver includes a discharge path to dissipate the residual electric charge of the pixel capacitor of the one or more pixels in the display panel.

16. The apparatus as claimed in claim 14, wherein the driver is to output the driver signal to the one or more pixels in the display panel during a delay time set after the disruption in power, the driver signal to allow for the residual electric charge of the pixel capacitor of the one or more pixels to be received.

17. The apparatus as claimed in claim 16, further comprising:

a level shifter to discharge naturally the driver signal while the residual electric charge is dissipated from the pixel capacitor of the one or more pixels.

18. The apparatus as claimed in claim 16, wherein the driver signal is a gate signal for the one or more pixels.

* * * * *